Nov. 28, 1961  F. GUYOT  3,010,277
SELF-WINDING WATCHES

Filed Feb. 3, 1958  2 Sheets-Sheet 1

INVENTOR.
Fred Guyot.
BY
Truman A. Herron.
ATTORNEY.

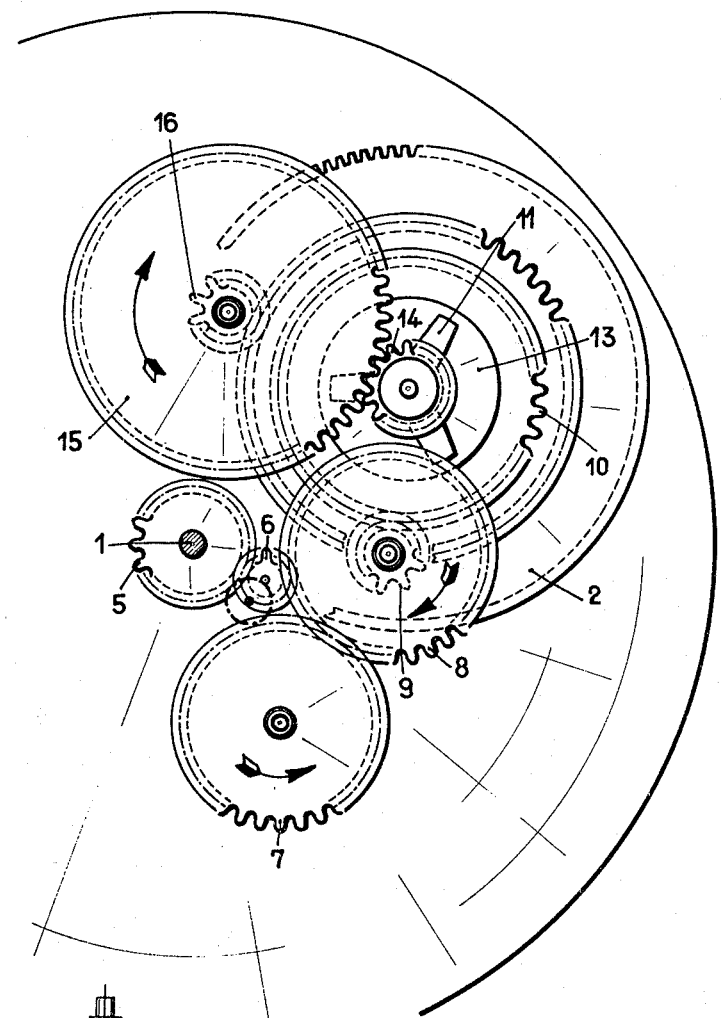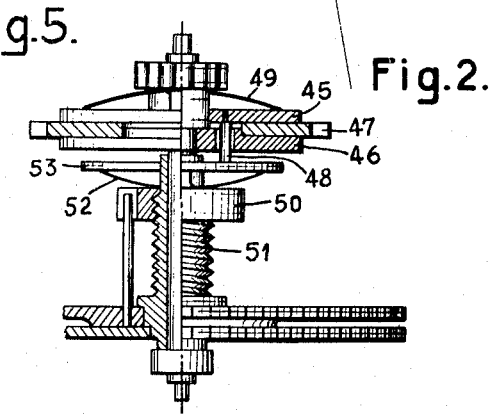

United States Patent Office 3,010,277
Patented Nov. 28, 1961

3,010,277
SELF-WINDING WATCHES
Fred Guyot, Bienne, Switzerland, assignor to Gruen Watch Mfg. Co. S.A., Bienne, Switzerland, a corporation of Switzerland
Filed Feb. 3, 1958, Ser. No. 712,973
Claims priority, application Switzerland Feb. 9, 1957
4 Claims. (Cl. 58—83)

This invention relates to a novel automatic means of preventing overwinding and/or underwinding of the main spring in a self-winding watch mechanism.

It will be appreciated that the lower limit reached by the mainspring, namely the unwinding, does not represent any stress danger for the spring. However, the upper limit, or wound-up state, presents a mechanical situation in which enough force is often applied to the mainspring to cause breakage or other damage. In a hand-wound watch, this danger does not occur because as the user winds the watch there is a sudden increase in resistance in the winding mechanism which he can feel, and consequently be made aware of the fact that the watch is wound tight.

Unlike the hand-wound watch, there is no human factor to recognize the tension brought to bear on the mainspring of an automatic self-winding watch, and therefore some device must be provided to prevent overwinding. Devices formerly used comprise claw clutch mechanisms, sliding braces and even mechanical limit stops. These devices, however, did not permit the transmission of a constant torque to the mainspring as these devices reflect essentially variable forces, depending upon lubricant, temperature and, of course, wear. Moreover, the space lost by the sliding brace, mechanical limit stops, and most of the clutch mechanisms inside the mainspring barrel served to reduce the reserve of operating time for the mainspring.

Another common type of device to prevent the overwinding of watches comprises that type which blocks the winding-up weight upon being operated by a differential system calibrated to a certain number of winding turns of the mainspring. An inherent failure in this type of device is that once the weight is blocked, a certain amount of operating time is necessary to set it free, thereby reducing the available reserve of operating time.

A major fault with present popular clutch systems is that they are generally comprised of engaging and disengaging gears. Obviously, the action of such devices utilizing the progressive penetration and meshing of gears produces variable and jerky force transmission, and at the same time, these devices suffer greatly from wear.

It is an object of the instant invention to provide for the smooth transmission of weight-winding torque to the mainspring through a limiting mechanism in the form of a friction clutch, the operation of which is influenced directly by the degree of mainspring tension. Due to this latter fact, the clutch operates as a coupler-limitor and has the added advantage of operating independently of outer conditions such as lubricant and temperature. The friction clutch in the instant device is adjusted to operate at a predetermined tension value of the mainspring so as to idle the winding mechanism when the spring becomes fully wound. This adjustment of the friction clutch is accomplished by the operation of a differential mechanism which is governed by both the unwinding mechanism and the winding mechanism.

It is a further purpose of this invention to provide a means of limiting the unwinding movement of the mainspring of a self-winding watch so that the spring always remains under some tension and therefore does not require hand winding to start it after the watch movement has completely run down.

A further purpose of the instant invention is to provide a self-winding watch in which the main spring is maintained under a tension to provide a maximum running reserve of operating time.

Another object of the instant invention is to provide a kinematic chain for a self winding watch in which the drive force is kept steady and smooth and in which the parts are not likely to be subject to any damaging stresses or strains.

For the attainment of these and such other objects as may appear or be pointed out, I have shown embodiments of my invention in the accompanying drawing, wherein:

FIGURE 2 is a partially diagrammatic top plan view of FIGURE 1.

FIGURE 5 is a partial cross section of a fourth embodiment of the invention disclosing a double spring operated friction clutch.

Figure 1:
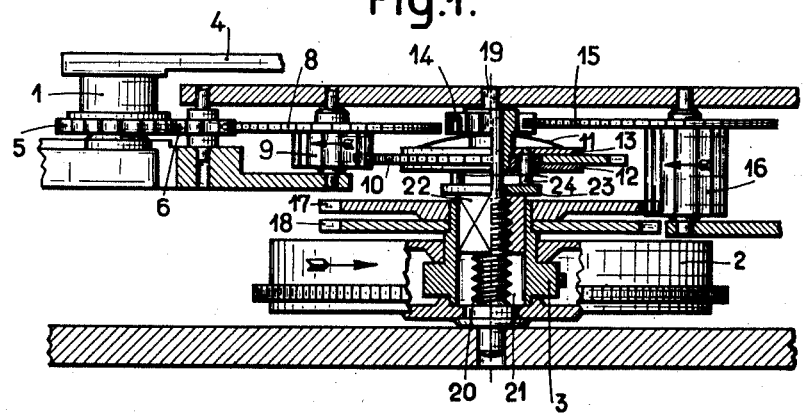
FIGURE 1 is a vertical cross section of the device disclosing the operation of the differential element and friction clutch in the kinematic chain.

It may be seen with reference to FIGURES 1 and 2 that the drawings illustrating the instant invention disclose only a portion of the mechanism of a self-winding watch, namely that portion concerned directly with the invention.

Again with reference to FIGURES 1 and 2, it may be seen that a winding-up weight including an arm 4 pivots at 1 so as to wind the mainspring, 2A between barrel 2 and barrel core 3. This winding weight drives one or the other of intermediate wheels 7 and 8 through weight pinion 5 and operating pinion 6. The purpose of this arrangement of intermediate wheels, which is well known in the art, is to provide constant torque transmission during both rotary directions of the weight pinion. The arrows transcribed in FIGURES 1 and 2 correspond to the winding rotary direction of the intermediate wheels, or runners just referred to.

With regard to the friction clutch mechanism, it will be seen that a pinion 9, fixed to intermediate wheel 8 drives a toothed crown friction disc 10 which is rotatably mounted on a spindle or clutch pivot 19. Toothed crown 10 is disposed between a lower clutch plate 12 and an upper clutch plate 13 which are also rotatably and axially mounted with respect to spindle 19. Upper clutch plate 13 is also vertically slidably mounted with respect to spindle 19. The clutch plates are urged together and frictionally interconnected for rotation together by the pressure of clutch spring 11 pressing downwardly on upper clutch plate 13. Pins 24 which are fixed to the upper clutch plate 13 project downwardly through an aperture in the lower clutch plate.

Fixed to the lower clutch plate 12 is a pinion 14 which is rotatably and axially mounted on the spindle 19. The pinion 14 drives a gear 15 which forms a coupling wheel between the pinion 14 and the mainspring 2A. A coupling wheel pinion 16 fixed to the coupling wheel 15 drivably engages a gear 17 fixed to the core 3 to which is connected one end of the spring 2A.

In the engaged position of the clutch, which is illustrated in FIGURE 1, upper clutch plate 13, which is free to move axially along clutch pivot 19, is urged downwardly against toothed crown 10 by clutch spring 11, thereby causing toothed crown 10 to be tightly gripped between the under surface of axially moveable upper clutch plate 13 and the upper surface of lower clutch plate 12. This frictional engagement between the toothed crown 10 and the upper and lower clutch plates provides for the transfer of winding torque from the winding weight, through the train of pinions and the intermediate wheels described above, to the clutch plates.

Since lower clutch plate 12 is fixed to clutch pinion 14, clutch pinion 14 is driven in the same manner as lower clutch plate 12. Clutch pinion 14 in turn drives coupling wheel 15 and its integral pinion 16, the latter driving barrel core 3 through core drive wheel 17. This action completes the kinematic chain from the winding weight to the barrel core and its spring 2A to wind spring 2A. At the same time, hand winding is made possible through a conventional ratchet wheel 18.

When the clutch plates 12 and 13 are compressed into engagement with the toothed crown 10, a complete driving engagement between the weight and the barrel core 3 exists. If the clutch plates are spread apart, upon reaching the desired degree of winding of the mainspring as described below, the toothed crown 10 will rotate freely when actuated by the winding weight and will not impart any stress to the mainspring.

The differential mechanism of the device which controls the action of the friction clutch in accordance with the tension on the mainspring, comprises a regulating nut 22 of rectangular cross section which is slidably mounted in a rectangular cross section bore 21 in the core 3. The nut 22 is internally threaded to engage a threaded portion 20 of the clutch pivot or spindle 19.

A washer 23 is rotatably mounted about pivot 19 and is engageable at the under surface thereof by the nut 22. The upper surface of the washer 23 is engageable with the depending pins 24 of upper clutch plate 13.

The spirally wound mainspring 2A is connected at its inner end to the core 3 and at its outer end to the drum 2. When the spring is stressed, the drum will be caused to rotate in the direction of the arrow with the gear teeth around the periphery of the drum driving the watch escapement and associated mechanism, all in a known manner.

The mainspring is wound by the rotation of the core 3 with respect to the drum 2. As core 3 rotates with respect to the drum, the nut 22 will rotate about threaded portion 20, fixed to the drum 2, and will be caused to be elevated from a lower most position to an upper position as shown in FIGURE 1. The vertical distance which the nut 22 can travel on the threaded portion 20 is directly proportional to the degree to which the spring 2A can be wound.

When the nut 22 reaches its uppermost position, the mechanism has been designed so that the spring will be sufficiently wound. At this point, the nut 22 drives the washer 23 into engagement with the depending pins 24 of upper clutch plate 13 thereby spreading clutch plates 12 and 13 to free the toothed crown 10 for idle rotation with respect to pinion 14. When toothed crown 10 is freed, no further winding of the spring 2A is possible for freeing of crown 10 releases the driving connection between the winding weight and core 3.

Assuming that the watch is at rest, there will be no activity of the winding weight, and as a consequence, there will be no rotational force imparted by the weight to core 3. The tightened spring will cause drum 2 to rotate slowly (which causes the continued operation of the watch) and unwinds the spring 2A. As the drum turns, the threaded portion 20 fixed to the drum will also turn with respect to the stationary core 3. Such relative movement will cause the nut 22 to move downwardly toward its lowermost position.

When the watch is worn, if the rate of rotation of the drum 2 is equal to the rate of rotation of the core 3 as driven by the winding weight, a differential action results with the core 3 and drum 2 moving slowly together without any winding of the spring. However, as the rate of movement of the core 3 exceeds the rate of movement of the drum 2, through greater activity of the winding weight, the mainspring will be wound and the nut 22 will ride upwardly on the threaded portion 20. In any event, the cessation of the automatic winding of the spring will always take place at exactly the same degree of spring stress, because the cessation of the winding of the spring is dependent upon the vertical position of the nut 22, which in turn is precisely dependent upon the annular distance which the core 3 has rotated with respect to the drum 2.

As nut 22 is lowered, during unwinding, clutch spring 11 exerts a force upon the upper face of clutch plate 13 forcing it downwardly so that its depending legs 24 follow the descent of washer 23 which resides upon the descending upper face of nut 22. This action will continue until nut 22 has been screwed downwardly far enough so that the underface of clutch plate 13 resides snugly against the upper face of toothed crown 10 which arrests the downwardly motion of clutch plate 13 and renders the clutch in the engaged or winding position. As soon as the winding weight, attached to arm 4, is actuated, the gear chain once again reacts in the manner indicated to wind spring 2A until such time as the friction clutch is cammed into the unengaged position by the operation of the differential elements, namely the screw 20 and the nut 22.

Figure 3:
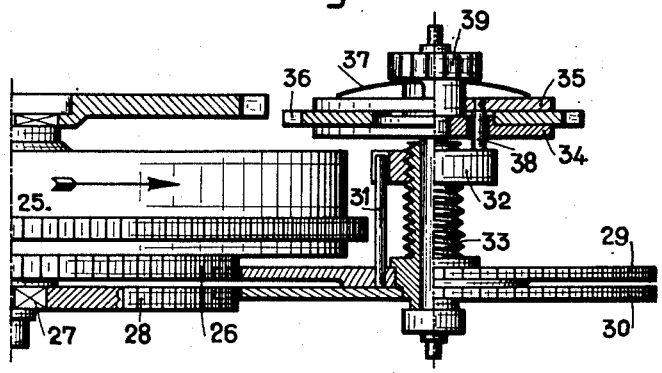
FIGURE 3 is a vertical cross section of a second embodiment of the invention disclosing the differential element placed outside the main spring barrel.

Whereas the first embodiment of the invention as shown in FIGURE 1 places the differential elements and the friction clutch coaxial with the barrel housing the spring 2A, the second embodiment shown in FIGURE 3 places these elements outside the barrel. In FIGURE 3 it may be seen that the barrel drum 25 is connected to toothed wheel 26, and core 27 is connected to toothed wheel 28, drum 25 and core 27 being rotatable with respect to each other as in the embodiment described above. Wheels 26 and 28 take part in the angular displacement of the drum and displaced core portion 31 by transmitting corresponding rotary motion to coaxial wheels 29 and 30.

Again with reference to FIGURE 3, it will be seen that a friction clutch is employed similar to the one shown in FIGURE 1. In FIGURE 3 it will be seen that clutch plates 34 and 35 enclose toothed crown 36, the upper clutch plate 35 abutting clutch spring 37 which maintains it in contact with the eventual action of nut 32 through depending feet 38 in the same manner as the action described of the clutch in FIGURE 1. Once again toothed crown 36 is driven by the winding weight and one again pinion 39 translates its rotary motion to the barrel through an appropriate gear train.

It will be appreciated that an advantage of the embodiment disclosed in FIGURE 3 lies in the fact that the placement of the watch-winding elements directly effects the configuration of the watch case itself, thereby allowing different watch case configurations and styles by rearranging the elements as disclosed in FIGURE 1 and FIGURE 3.

Figure 4:
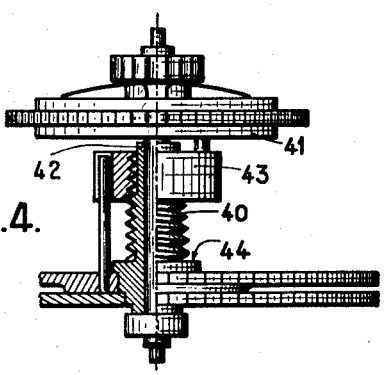
FIGURE 4 is a partially vertical cross section of a third embodiment of the invention disclosing a stop work to limit the unwinding of the mainspring.

As has been said in regard to the embodiments disclosed in FIGURES 1 and 3, the differential elements, namely the nut and screw threads, are set so that the friction clutch will idle or slip at some time before the tension imparted to the mainspring reaches damaging proportions. In the third preferred embodiment which is disclosed in FIGURE 4, a device is disclosed whereby the setting of the differential elements is accomplished by similar hand winding.

This mechanism, only partially represented, is identical to that of FIGURE 3 with the exception that threaded portion 40 does not extend upwardly all the way to the undersurface of lower clutch plate 41, but instead allows for a smooth cylindrical portion 42 which extends for such a distance so as to permit nut 43 to become free with its engagement with the screw threads. When the spring is wound by hand, nut 43 will rise until it comes upon the smooth portion of the screw and will stop at this position which corresponds to the position of the clutch release reached in the device shown in FIGURES 1 and 3. As soon as the nut 43 passes upwardly beyond screw threads 40, it will merely turn idle on the screw portion no matter how long the hand winding lasts.

A further feature of this third embodiment lies in the means of limiting the degree of unwinding of the mainspring. It will be seen that beneath the relatively short screw threads 40 there rests a limit plate 44 which will abut the lower face of downwardly descending nut 43 thereby stopping its descent and at the same time stopping the unwinding of the spring due to the fact that, as is shown in FIGURE 1, screw 40 is fixed to the drum. This novel stop work which can be provided in any of the embodiments shown makes it possible to provide a watch which when stopped does not require hand winding to get the movement started due to the fact that at the first motion of the winding weight the spring will have sufficient tension to insure immediate operation.

The embodiment disclosed in FIGURE 5 is similar to that of FIGURE 3 except for the interposition of an additional spring 52 and an intermediate rest plate 53 located between nut 50 and depending legs 48 of upper clutch plate 45. This clutch operates in the same manner as those described above, the rising nut 50, gradually counteracting the action of the clutch spring 49 so as to progressively decrease the pressure exerted by upper clutch plate 45 upon toothed crown 47 until the toothed crown begins to idle between clutch plates 45 and 46. As stated before, this idling or clutch release condition is equilibrated with the desired "wound-up" stress of the mainspring.

It can be seen that the instant device which is insensitive to lubricant and temperature conditions, properly limits the stress applied to the mainspring without any meshing gears or parts, thereby eliminating a prime cause of fatigue and wear, while at the same time providing the highest degree of efficiency and unlimited life. All this is accomplished with the assurance that the mainspring is protected against the application of excess torque, from either the hand or automatic winding mechanisms. Moreover, the device provides for a maximum of going time by doing away with limiting devices of the type designed for operation within the barrel which force a reduction in the stress volume of the mainspring because of the space they occupy.

I claim:

1. An automatic mainspring tension regulating device for a self-winding watch having a mainspring fixed at one end to a rotatable drum, and a pivoted weight member, said device comprising; a wind-up core rotatably mounted in said drum and connected to the other end of said mainspring, a gear train connecting said weight to said wind-up core to impart unidirectional rotary motion to said core, a friction clutch connected in said gear train to interrupt transmission of motion from said weight to said core, spring means connected to said clutch to urge said clutch into operable engagement for transmission of motion from said weight to said core, and a clutch release mechanism driven by rotation of said core with respect to said drum, said release mechanism being engageable with said clutch to interrupt said clutch from operable engagement in said gear train upon a predetermined angular movement of said core with respect to said drum, said angular movement corresponding to the amount of torque transferred to said mainspring.

2. An automatic mainspring tension regulating device for a self-winding watch having a mainspring fixed at one end to a rotatable drum, and a pivoted weight member, said device comprising; a clutch gear, a gear train connecting said weight to said clutch gear to impart unidirectional rotary motion to said clutch gear as said weight moves, a friction clutch engageable with said clutch gear, spring means urging said clutch to rotate with said clutch gear, a wind-up core rotatably mounted with respect to said drum and connected to the other end of said mainspring, gear means driveably connecting said core to said clutch, and a clutch release mechanism driven by rotation of said core with respect to said drum, said release mecha- nism being engageable with said clutch to release said clutch from engagement with said clutch gear upon a predetermined angular movement of said core with respect to said drum, said angular movement corresponding to the amount of torque transferred to said mainspring.

3. An automatic mainspring tension regulating device for a self-winding watch having a mainspring fixed at one end to a rotatable drum, and a pivoted weight member, said device comprising; a friction clutch, a differential mechanism, gear means interconnecting said pivoted weight mmeber, friction clutch and differential mechanism to drive said differential mechanism upon the engagement of said clutch, said friction clutch comprising; a clutch spindle fixed to rotate with said drum, a clutch pinion, a clutch spring, upper and lower clutch plates and a central friction disc, said clutch pinion, upper and lower clutch plates and central friction disc all being axially mounted upon said clutch spindle with said disc between said clutch plates, said clutch plates and central friction disc being rotatably mounted on said spindle, at least one of said clutch plates being axially mobile upon said spindle, one of said clutch plates being fixed to said clutch pinion, said gear means interconnecting said clutch to said pivoted weight member engaging said central friction disc, said clutch spring biasing one of said clutch plates axially along said spindle to frictionally engage said disc between said clutch plates to drive said clutch plates and clutch pinion; said differential mechanism comprising; a core portion having a central bore and being fixed to the other end of said mainspring, a regulating nut, a threaded portion of said clutch spindle, said core being rotatably mounted on said spindle at least partially inside said drum, said spindle passing through said bore, said nut being snugly seated in said bore and threadably engaged upon said spindle to be moved axially on said spindle by said threads upon the rotation of said core, means connecting said nut to the clutch plate biased by said clutch spring, said interconnecting gear means connecting said clutch pinion with said core to rotate said core and wind said mainspring upon the movement of said pivoted weight member, thereby moving said nut axially along said spindle until said means connecting the nut to said spring-biased clutch plate overcomes the spring force of said clutch spring so as to spread the clutch plates and bring about a slipping of said clutch to stop the winding of the mainspring, said mainspring unwinding to rotate the drum around the core and turn said spindle so as to move said nut in the other axial direction along said spindle, allowing said clutch to cease slipping and commence winding the mainspring.

4. An automatic mainspring tension regulating device for a self-winding watch of the type having a mainspring, a pivoted weight member, a rotatable mainspring-containing drum, a spring-biased friction clutch, gear means interconnecting said weight, clutch and regulating device to drive said regulating device upon the engagement of said clutch, one end of said mainspring being fixed to said drum, said regulating device comprising; a core portion having a central bore, said core being fixed to the other end of said mainspring inside of said drum, a regulating nut, a threaded spindle being fixed to turn with said drum, said core being rotatably mounted on said spindle, said spindle passing through said bore, said nut being snuggly seated in said bore and threadably engaged upon said spindle to be moved axially on said spindle upon the rotation of said core, means releasably engaging said nut with said clutch, said interconnecting gear means connecting said clutch with said core so as to rotate said core and wind said mainspring upon the movement of said pivoted weight member when said clutch is engaged, thereby moving said nut axially along said spindle until said means releasably engaging said nut with said clutch overcomes the force of said spring and renders the clutch inoperative so as to stop the winding of the mainspring, whereupon the spring unwinds to rotate the drum around the core and move said nut in the other axial direction along said spindle, allowing said spring to reactivate said clutch and commence winding the mainspring.

References Cited in the file of this patent

UNITED STATES PATENTS

| | | |
|---|---|---|
| 424,418 | Hitt | Mar. 25, 1890 |
| 458,911 | Lucas et al. | Sept. 1, 1891 |
| 2,098,737 | Bornfriend | Nov. 9, 1937 |
| 2,661,591 | Thiebaud | Dec. 8, 1953 |

FOREIGN PATENTS

| | | |
|---|---|---|
| 262,721 | Great Britain | May 5, 1927 |
| 292,855 | Switzerland | Nov. 16, 1953 |
| 300,078 | Switzerland | Sept. 16, 1954 |